July 12, 1949.   J. A. BALLENTINE   2,475,870
DOG HARNESS
Filed Aug. 7, 1947   2 Sheets-Sheet 1
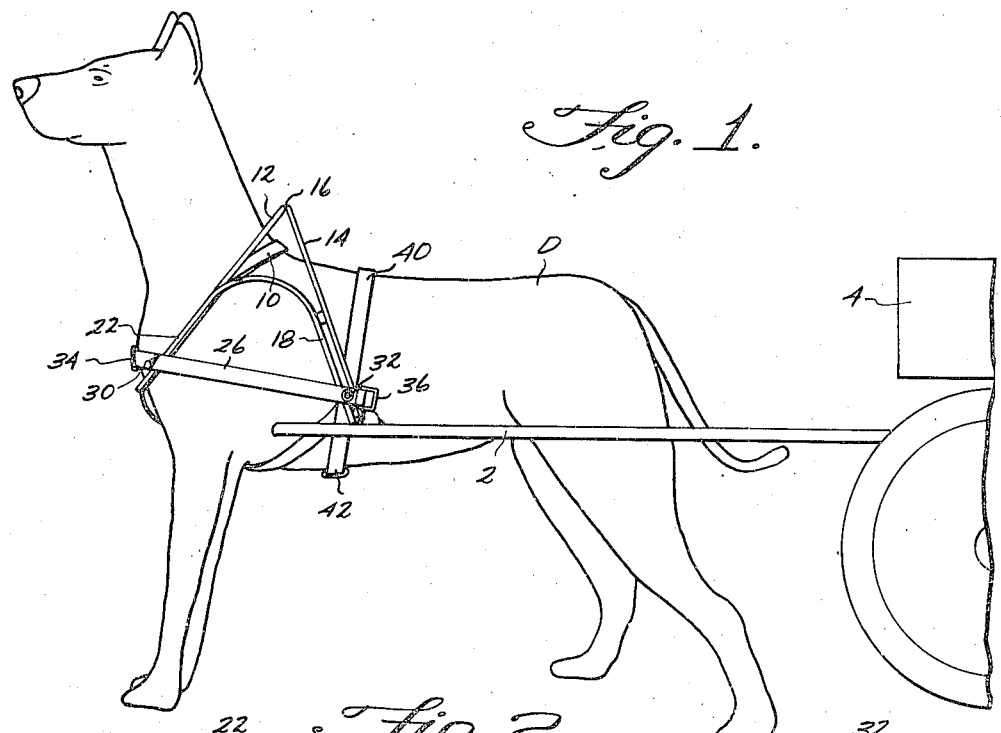
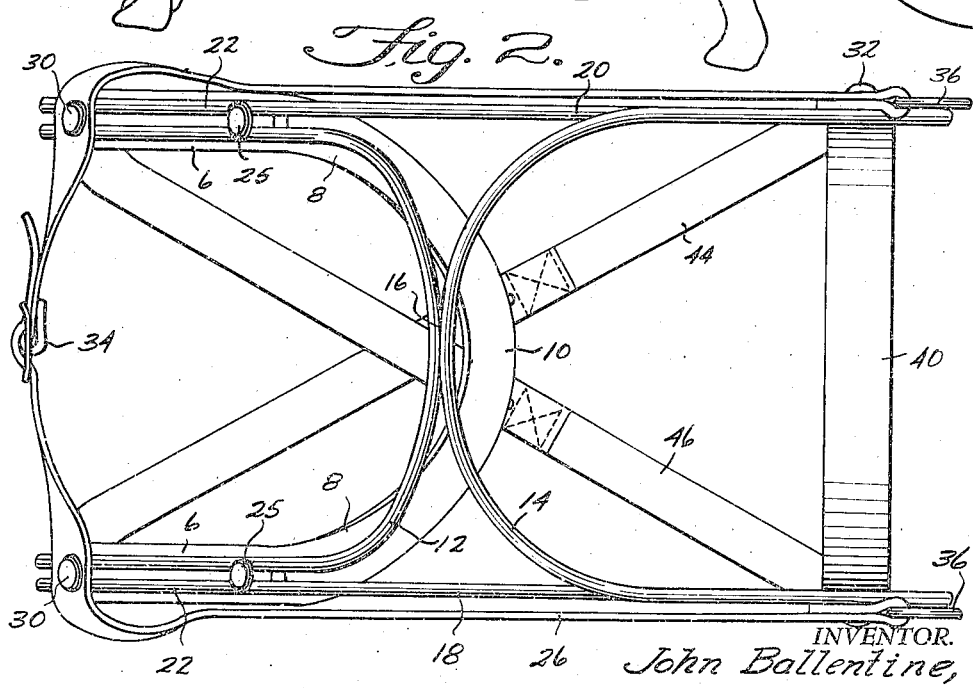
INVENTOR.
John Ballentine,
BY Victor J. Evans & Co.
ATTORNEYS July 12, 1949.                J. A. BALLENTINE                2,475,870
                                 DOG HARNESS
Filed Aug. 7, 1947                                          2 Sheets-Sheet 2
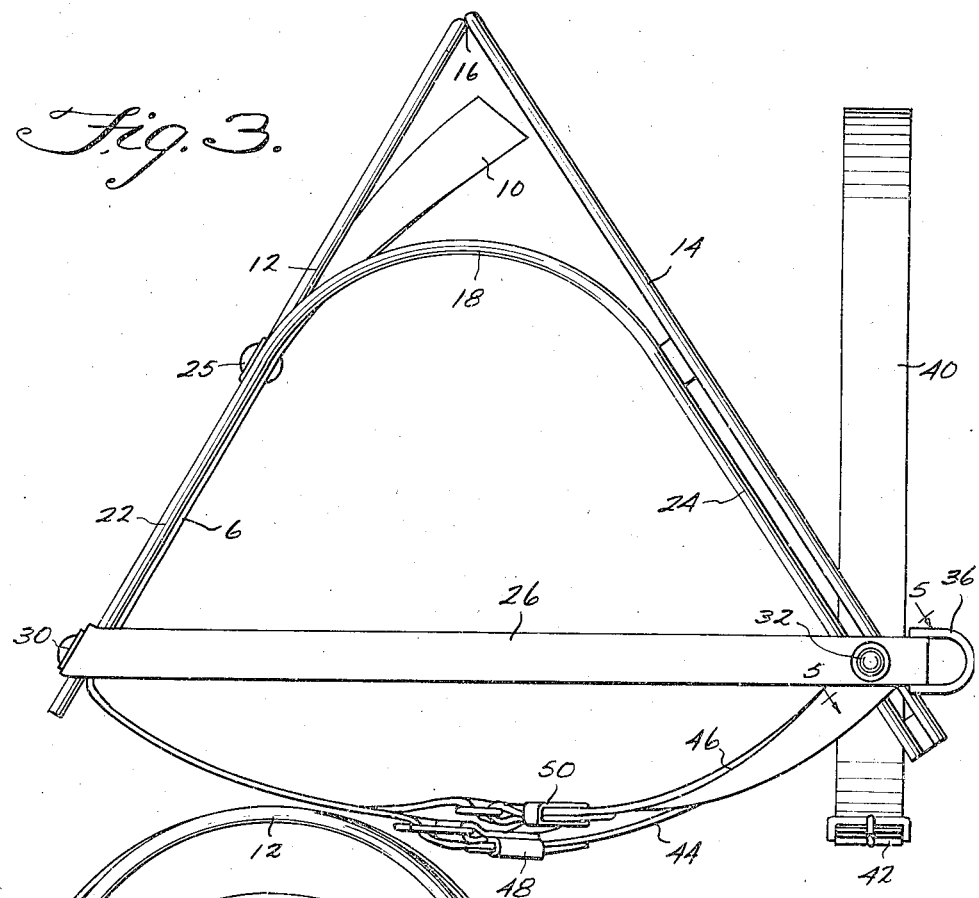
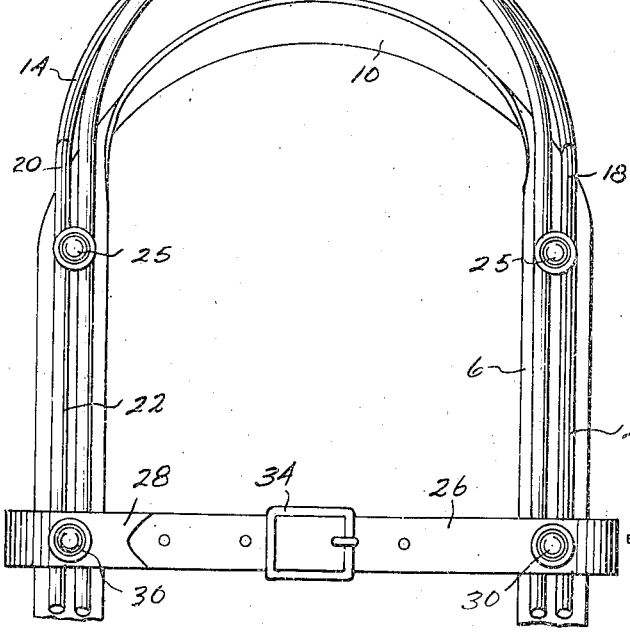
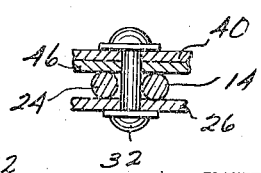
INVENTOR.
John Ballentine,
BY Victor J. Evans & Co.
ATTORNEYS Patented July 12, 1949

2,475,870

UNITED STATES PATENT OFFICE 2,475,870

DOG HARNESS

John Alfred Ballentine, Indianapolis, Ind.

Application August 7, 1947, Serial No. 767,000

2 Claims. (Cl. 54—1)

My present invention relates to an improved dog harness and especially to a draft harness by means of which the dog may pull a wagon, sled or other vehicle in comfort and with safety to the dog, and the vehicle and occupants.

My harness is adjustable to fit dogs of various sizes, and in addition may be adjusted to conform to the natural inclination of many dogs to travel forwardly with the body at an angle.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a side elevational view of a dog in the harness of my invention.

Fig. 2 is a top plan view of the harness.

Fig. 3 is a side elevational view.

Fig. 4 is a front elevational view.

Fig. 5 is a sectional view at line 5—5 of Fig. 3.

Referring now to the drawings wherein I have illustrated the present preferred embodiment of my invention I have the dog D through my harness connected with the shaft 2 of the wagon 4.

The harness consists of a rigid frame including a neck band or collar 6 twisted at 8 to rest comfortably along the curve 10 on the dog's back. Rod yokes 12 and 14 space the forward ends of the collar from the rear of the harness and these yokes are welded or otherwise suitably secured to each other at 16 with the yokes angularly disposed, the apex of the angle being substantially vertically of the collar.

A pair of curved braces 18 and 20 having legs 22 and 24 which extend along and parallel with the lower portions of the yokes 12 and 14 and secured by rivets 25, properly space the front and rear portions of the harness.

Breast straps 26 and 28 are secured at 30 and 32 to the rigid frame and are detachably secured to each other in front of the dog's chest by buckle 34, the rear ends of the straps having D-rings 36 to receive chains for attachment to the wagon shafts.

A rear strap or belt 40 forming a belly band is also attached to the frame and to the straps 26 and 28 at 32, and the ends may be adjusted by buckle 42.

Cross straps 44 and 46 pass under the dog's body between the forelegs and connect the opposite points of the frame, and buckles 48 and 50 permit adjustment thereof.

Thus it will be seen that the rigid frame will rest comfortably upon the back of the dog, and that the various straps permit adjustment to a snug fit to prevent chafing and discomfort to the dog.

With the harness of my invention the dog will quickly learn his work and will enjoy his part in the hauling either in children's play, or in performing tasks.

Having thus fully described my invention what I claim as new and desire to secure by Letters Patent is:

1. A dog harness comprising a breast strap extended around the chest and shoulders of a dog, a neck band positioned to extend over the neck of the dog with the ends of the band secured to the breast strap, a pair of arcuate yokes depending over the back of the dog with the ends thereof secured to the breast strap at spaced points and with the upper intermediate parts of the yoke connected, and, with the breast strap forming a triangle, arcuate support braces secured to the lower ends of the yoke maintaining the said lower ends of the yoke in spaced relation, and a belly band secured to the ends of the breast strap and extending around the body of the dog.

2. A dog harness comprising a breast strap extended around the chest and shoulders of a dog, a neck band positioned to extend over the neck of the dog with the ends of the band secured to the breast strap, a pair of arcuate yokes depending over the back of the dog with the ends thereof secured to the breast strap at spaced points and with the upper intermediate parts of the yokes connected, and, with the breast strap forming a triangle, arcuate support braces secured to the lower ends of the yokes maintaining the said lower ends of the yokes in spaced relation, a belly band secured to the ends of the breast strap and extending around the body of the dog, and a pair of brace straps crossed under the body of the dog with the ends connected to the lower end of the yokes and breast strap.

JOHN ALFRED BALLENTINE.

REFERENCES CITED

The following references are of record in the file of this patent:

UNITED STATES PATENTS

| Number | Name | Date |
|---|---|---|
| 16,660 | Smith | Feb. 17, 1857 |
| 347,229 | Coatsworth | Aug. 10, 1886 |
| 689,191 | Hunt | Dec. 17, 1901 |

FOREIGN PATENTS

| Number | Country | Date |
|---|---|---|
| 395,108 | Great Britain | July 13, 1933 |